Figure 2:
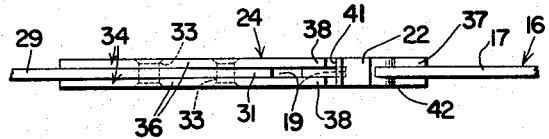

May 18, 1965  R. E. JOHNSON ETAL  3,183,947
ROTARY SAW BLADE WITH SAFETY GUARD
Filed Feb. 5, 1962

INVENTOR.
RALPH E. JOHNSON AND
FREDERICK R. WIEHL
BY
Marshall J. Breen
ATTORNEY

United States Patent Office 3,183,947
Patented May 18, 1965

3,183,947
ROTARY SAW BLADE WITH SAFETY GUARD
Ralph E. Johnson, Boonton, and Frederick R. Wiehl, Westfield, N.J., assignors to The Singer Company, a corporation of New Jersey
Filed Feb. 5, 1962, Ser. No. 171,201
6 Claims. (Cl. 143—133)

This invention relates to rotary or circular saw blades and more particularly to tooth guards, which guards are carried by the rotary saw blade per se.

Power driven circular saws, both of the bench and portable varieties, are in constant use by professional workmen and do-it-yourself amateurs. It is a recognized fact that power driven circular saws can greatly increase a workman's productivity, but it is also known that conventional power driven circular saws are dangerous implements which have caused many accidents. Therefore, one of the primary objects of the present invention is to provide an improved rotary saw blade having safety features not previously known.

Another object of the invention is to provide an improved rotary saw blade having a safety guard mounted on the saw blade.

A further object of this invention is to provide an improved rotary saw blade having portions which move when the blade is rotated and which also move when a saw cut is made.

A still further object of the invention is to provide an improved rotary saw blade with safety guard wherein the movement of the guard toward and away from the center of the blade is limited to a predetermined amount.

Another object of the invention is to provide an improved rotary saw blade having guard means which functions while the blade is rotating to prevent the blade from injuring the operator.

With the above and other objects in view, as will hereinafter appear, the invention comprises the devices, combinations and arrangements of parts hereinafter set forth and illustrated in the accompanying drawings of a preferred embodiments of the invention, from which the several features of the invention and the advantages attained thereby will be readily understood by those skilled in the art.

Figure 3:
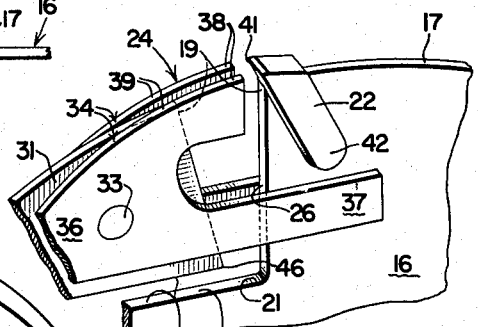
Figure 1:
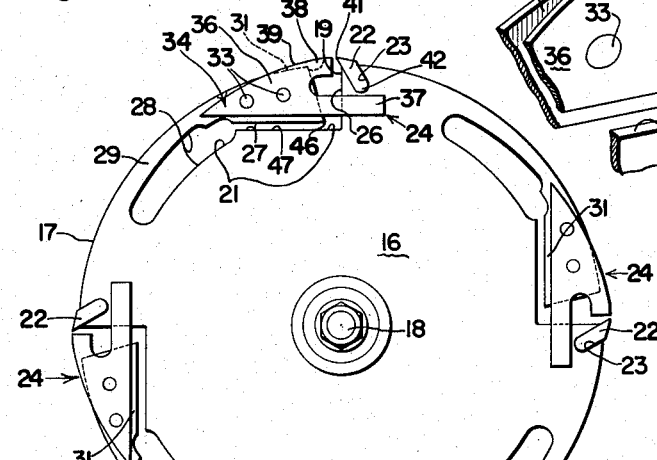
Figure 4:
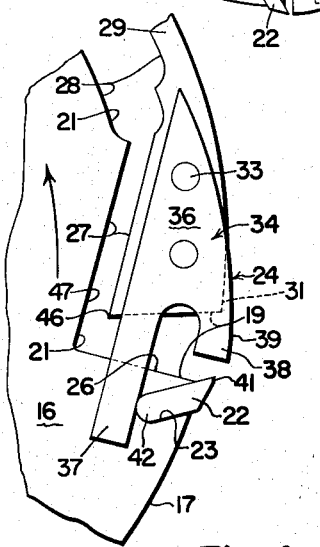
Figure 5:
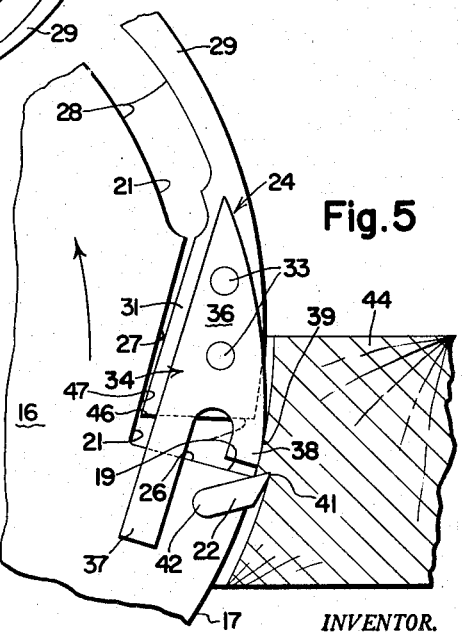

In the drawings:

FIG. 1 is a vertical view showing a rotary drive shaft on which is mounted a rotary saw blade and safety guards embodying the present invention, FIG. 2 is a fragmentary slightly enlarged top plan or edge view of the saw blade shown in FIG. 1, FIG. 3 is a further enlarged perspective view of a portion of the saw blade shown in FIGS. 1 and 2, FIG. 4 is a fragmentary portion of the saw blade with the blade rotating in the direction of the arrow, and FIG. 5 is a view similar to FIG. 4, except that the saw blade is shown cutting a piece of wood.

Referring in detail to the drawings, the present invention is shown as applied to a rotary or circular saw blade body 16 having a peripheral or circumferential edge 17, the blade 16 being shown as mounted on a drive-shaft 18. The circumferential edge 17 of the blade 16 as herein shown is interrupted by the open ends or mouths 19 of four substantially Z-shaped irregular slots 21 formed in the body of the saw blade 16. Preferably the body of the blade 16 will be made of relatively thin, high strength steel and the blade of the illustrated embodiment carries four replaceable cutting teeth 22, each tooth 22 being set into a tooth receiving slit 23. The four teeth 22 are equidistantly spaced around the circumferential edge 17 of the blade 16 and each tooth 22 has associated therewith a guard member indicated generally by the numeral 24. Because the four teeth 22 as well as the four guard members 24 are identical, it will suffice to describe in detail only one of these tooth-guard combinations.

As best seen in FIG. 1, the slot 21 comprises four slot portions, namely, the previously mentioned mouth 19, a partially radially extending portion 26, a narrow portion 27 extending parallel to a tangent of the circumference, and a circumferentially extending portion 28. By reason of the slot 21, the blade 16 is caused to have an integral cantilever yielding arm 29, the free or distal end of which is formed with an integral substantially triangular head 31. The head 31 is preferably provided with one or more holes adapted to accommodate one or more rivets or other fastening means 33. The rivets 33 secure the guard member 24, which comprises a pair of apertured plates 34—34, to the head 31 in such a manner that one plate 34 is held on each side face of the head 31. Each plate 34 is formed with three integral parts, namely a body portion 36, a stop finger 37 and a shrouding lug 38 having a protruding surface 39. One end of the tooth 22 is formed with a cutting edge 41 and the other end is formed with a heel 42 against which the finger 37 abuts in a manner presently to be described.

Reference to FIGS. 2 and 3 shows that the axial thickness of the cutting tooth 22 is substantially the same as the combined thicknesses of the blade 16 and the two lugs 38—38 of the plates 34—34.

In operation, the saw blade 16 of the present invention functions in the following manner. When the blade 16 is not rotating, the arms 29 and guard members 24 are in the positions shown in FIG. 1, wherein the surfaces 39 and the cutting edges 41 are equidistantly located from the center of the shaft 18 and thus from the center of the blade 16.

When the blade 16 rotates, centrifugal force causes the free ends of the arms 29 and the guard members 24 to fly outwardly to the position shown in FIG. 4, in which position the surfaces 39 of the lugs 38 extends outwardly a greater radial distance from the center of the blade 16 than do the cutting edges 41 of the teeth 22. Thus, when the blade 16 is rotating each guard member 24 shrouds the cutting edge of its respective cutting tooth 22 and experience has shown that a person's hand will not be injured even though the hand comes in contact with the edge of the rotating blade. The arm 29, which carries the guard member 24, is prevented from excessive movement outwardly by reason of the free end of the finger 37 (FIG. 4) engaging the heel 42 of the tooth 22.

When the blade is used to cut a piece of wood or the like 44, the rotating blade 16 will be forced against the material to be cut in the manner shown in FIG. 5. Engagement of the surfaces 39 of the plates 34—34 against the wood 44 causes the arms 29 to be depressed toward the center of blade 16, thus allowing the cutting edges 41 of the teeth 22 to extend radially beyond the surface 39 of the lug 38. This permits the teeth 22 to cut the wood or the like 44. Movement of the arm 29 toward the center of the blade 16 is limited by engagement of a corner 46 of the head 31 with a side 47 of the tangential portion 27 of the irregular slot 21.

Thus the blade 16 can be rotated without the danger of having the cutting edges 41 of the teeth 22 injure an operator and without the danger of the arms 29 and the guard members 24 being forced to move too far outwardly or inwardly from their normal positions shown in FIG. 1.

Having thus described the nature of the invention, what we claim herein is:

1. A rotary saw comprising in combination a blade body having a substantially circular peripheral edge formed with at least one interruption, at least one yielding cantilever arm formed on said blade body and defining one side of a slot extending into the blade body from the interruption formed in said peripheral edge and said slot extending in a circumferential direction away from one side of said interruption, a cutting tooth carried by said blade body adjacent to the other side of said interruption and at the periphery of said blade body, and a guard member secured to the free end of said yielding arm adjacent to said first side of said interruption at the periphery of said blade body, said guard member being effective to shroud said tooth during non-cutting rotation of said blade body.

2. A rotary saw comprising in combination a blade body having a substantially circular peripheral edge formed with at least one interruption, at least one yielding cantilever arm formed on said blade body and defining one side of a slot extending into the blade body from the interruption formed in said peripheral edge and said slot extending in a circuferential direction away from one side of said interruption, a cutting tooth carried by said blade adjacent to the other side of said interruption and at the periphhery of said blade body, a portion of said cutting tooth protruding beyond the peripheral edge of said blade body, and a guard member secured to the free end of said yielding arm adjacent to said first side of said interruption at the periphery of said blade body, said guard member having a protruding portion extending beyond the peripheral edge of said blade body, and said guard member being effective to shroud said tooth during non-cutting rotation of said blade body.

3. A rotary saw comprising in combination a blade body having a substantially circular peripheral edge formed with at least one interruption, at least one yielding cantilever arm formed on said blade body and defining one side of a slot extending into the blade body from the interruption formed in said peripheral edge and said slot extending in a circumferential direction away from one side of said interruption, a cutting tooth carried by said blade body adjacent to the other side of said interruption and at the periphery of the blade body, a portion of said cutting tooth protruding beyond the peripheral edge of said blade body, and a guard member secured to the free end of said yielding arm adjacent to said first side of said interruption at the periphery of said blade body, and said cantilever arm having a portion so constructed and arranged as to engage the blade body during cutting and thereby limiting the movement of said cantilever arm in an inward direction.

4. A rotary saw comprising in combination a blade body having a substantially circular peripheral edge formed with at least one interruption, at least one yielding cantilever arm formed on said blade body and defining one side of a slot extending into the blade body from the interruption formed in said peripheral edge and said slot extending in a circumferential direction away from one side of said interruption, a cutting tooth carried by said blade body adjacent to the other side of said interruption and at the periphery of said blade body, and a guard member carried by the free end of said cantilever arm adjacent to said first side of said interruption at the periphery of said blade body, a finger carried by the free end of said cantilever arm and extending across said interruption, and a member carried on the tooth side of said interruption at a location engageable by said finger during non-cutting rotation of said blade body to thereby limit the outward movement of said cantilever arm.

5. A rotary saw comprising in combination a blade body having a substantially circular peripheral edge formed with at least one interruption, at least one yielding cantilever arm formed on said blade body and defining one side of a slot extending into the blade body from the interruption formed in said peripheral edge and said slot extending in a circumferential direction away from one side of said interruption, the free end of said cantilever arm having a substantially triangular head, a cutting tooth carried by said blade body adjacent to the other side of said interruption and at the periphery of said blade body, and a guard member carried by the triangular head of the cantilever arm, a finger carried by said guard member and extending beyond said interruption to engage said tooth during non-cutting rotation of said blade body.

6. A rotary saw comprising in combination a blade body having a substantially circular peripheral edge formed with at least one interruption, at least one yielding cantilever arm formed on said blade body and defining one side of a slot extending into the blade body from the interruption formed in said peripheral edge and said slot extending in a circumferential direction away from one side of said interruption, a cutting tooth carried by said blade adjacent to the other side of said interruption and at the periphery of said blade body, a guard member carried by the free end of said cantilever arm adjacent to said first side of said interruption, and first means carried by the free end of cantilever arm, second means carried by said blade body, said first means being engageable against said second means to limit movement of said cantilever arm during rotation of said blade body.

References Cited by the Examiner

UNITED STATES PATENTS

| | | | |
|---|---|---|---|
| 801,748 | 10/05 | Simpson | 144—218 |
| 866,044 | 9/07 | Marshall | 144—251 |
| 1,161,857 | 11/15 | Hadaway. | |
| 1,242,369 | 10/17 | Parker | 144—251 |
| 2,187,221 | 1/40 | Brown | 144—251 X |
| 2,488,834 | 11/49 | Simpson. | |

WILLIAM W. DYER, Jr., *Primary Examiner.*

DONALD R. SCHRAN, *Examiner.*